B. E. FLANDERS.
FURNITURE-CASTER.
No. 182,361. Patented Sept. 19, 1876.
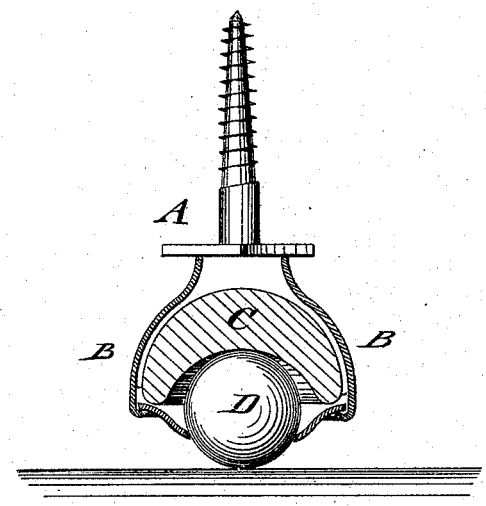

UNITED STATES PATENT OFFICE.

BENJAMIN E. FLANDERS, OF BROOKLYN, NEW YORK.

IMPROVEMENT IN FURNITURE-CASTERS.

Specification forming part of Letters Patent No. 182,361, dated September 19, 1876; application filed August 7, 1876.

*To all whom it may concern:*

Be it known that I, BENJAMIN E. FLANDERS, of Brooklyn, in the county of Kings and State of New York, have invented a new and Improved Caster, of which the following is a specification:

The accompanying drawing represents a vertical central section of my improved caster.

The object of my invention is to provide a caster for furniture of all kinds, by which the friction is diminished in a great measure, so that the caster works more effectively, and with greater durability.

The invention consists of a caster, the socket of which is provided with an interior concavo-convex glass shell, which extends from the upper point of greatest pressure, and bears on the revolving ball that is retained by an outer metallic casing, as will be hereinafter more fully described and definitely claimed.

In the drawing, A represents a caster that is made in the customary manner, of an outer metallic casing, B, which is secured by a center screw-bolt to the legs or feet of furniture. A glass shell, C, of concavo-convex shape, and sufficient thickness to resist the pressure exerted thereon, is tightly seated into the metallic casing B, either by fitting the same accurately thereto, or applying it by suitable cement, or otherwise. The revolving ball D is retained in the casing B, by an encircling flange or bearing, and moved along the concave surface of glass shell with very little friction. The glass shell forms an anti-friction bearing, and its concave or bearing surface is made of a diameter larger than the revolving ball, so that the center of the shell bears on the top of the ball, and produces by the small degree of friction between ball and shell, and the continuous turning of the ball without the tendency to wear out or flatten at some points so as to destroy thereby the efficiency of the caster, as is the case with the common style of casters in use.

As the friction between shell and ball is reduced to a minimum, the wear is imperceptible, and an effective and durable caster is thereby obtained.

I am aware that agate or glass bearings, and a partial lining of the socket with glass, have been heretofore employed.

Having thus described my invention, I claim as new and desire to secure by Letters Patent—

A caster-socket provided with an anti-frictional bearing of glass extended from the upper point of greatest pressure, and around the upper half of the ball to avoid friction with the metallic shell, as shown and described.

BENJAMIN E. FLANDERS.

Witnesses:
 PAUL GOEPEL,
 C. SEDGWICK.